May 4, 1954   E. X. SCHMIDT   2,677,276
LIQUID LEVEL AND TEMPERATURE INDICATING APPARATUS
Filed July 26, 1948   4 Sheets-Sheet 1
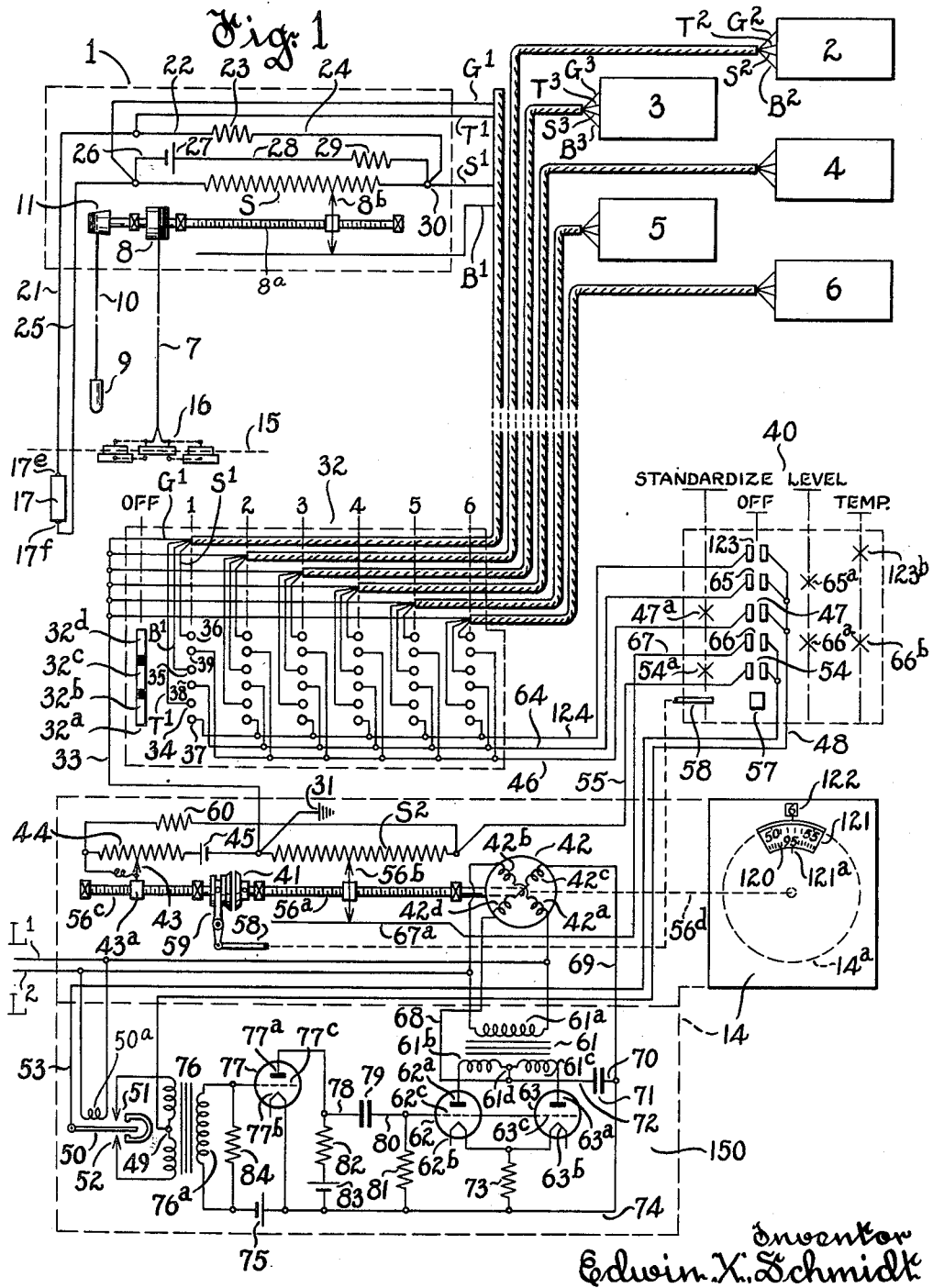
Inventor
Edwin X. Schmidt
By
Attorney

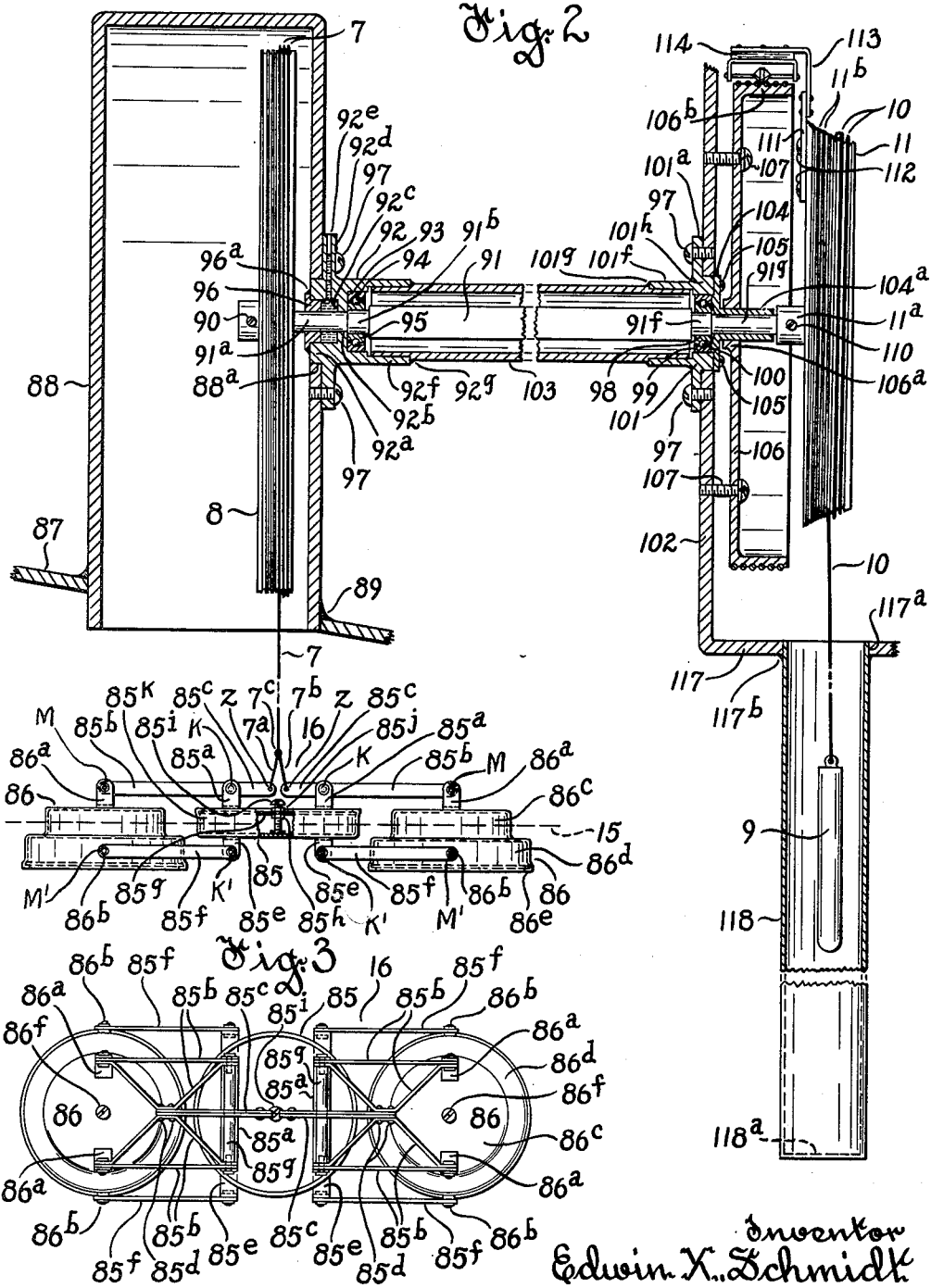

May 4, 1954     E. X. SCHMIDT     2,677,276
LIQUID LEVEL AND TEMPERATURE INDICATING APPARATUS
Filed July 26, 1948     4 Sheets-Sheet 3
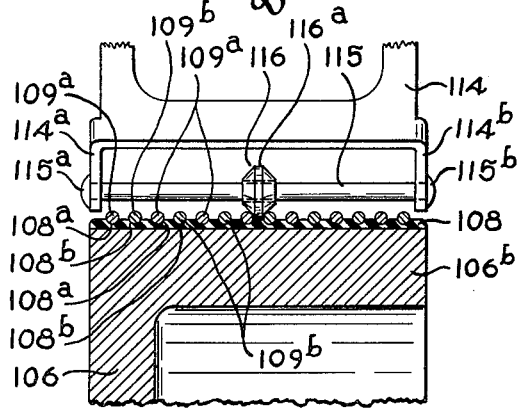
Fig. 4
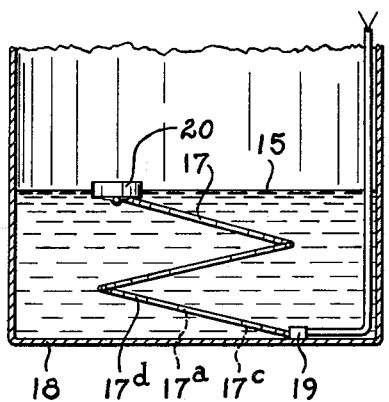
Fig. 5
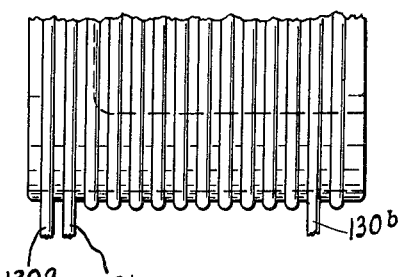
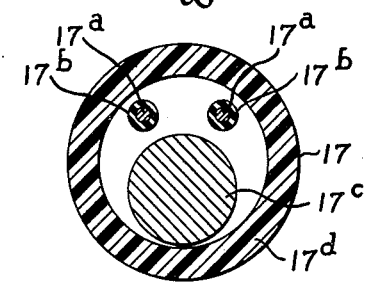
Fig. 6
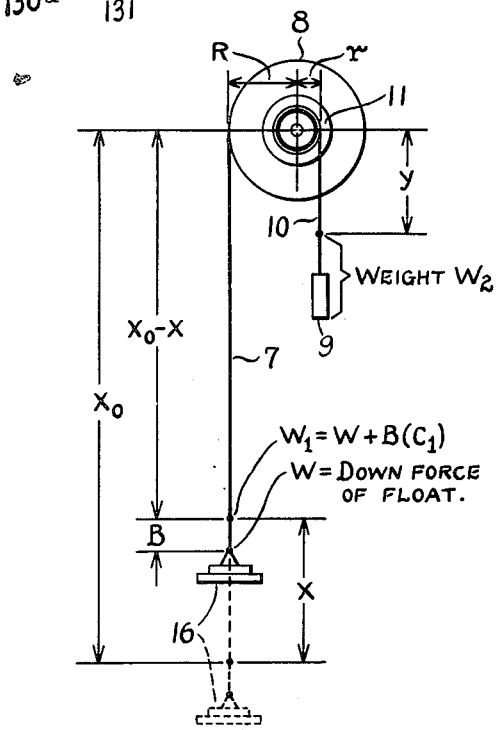
Fig. 7
Inventor
Edwin X. Schmidt
By
Attorney May 4, 1954   E. X. SCHMIDT   2,677,276
LIQUID LEVEL AND TEMPERATURE INDICATING APPARATUS
Filed July 26, 1948   4 Sheets-Sheet 4
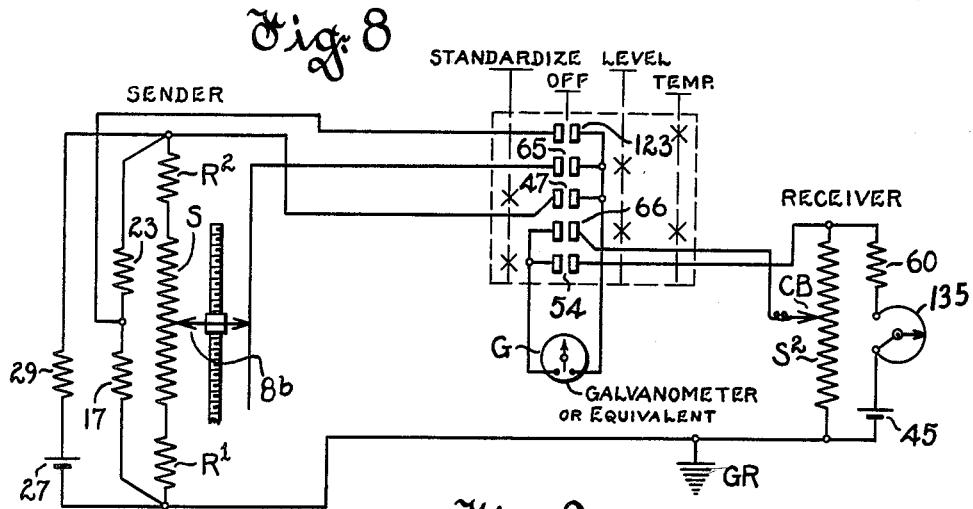
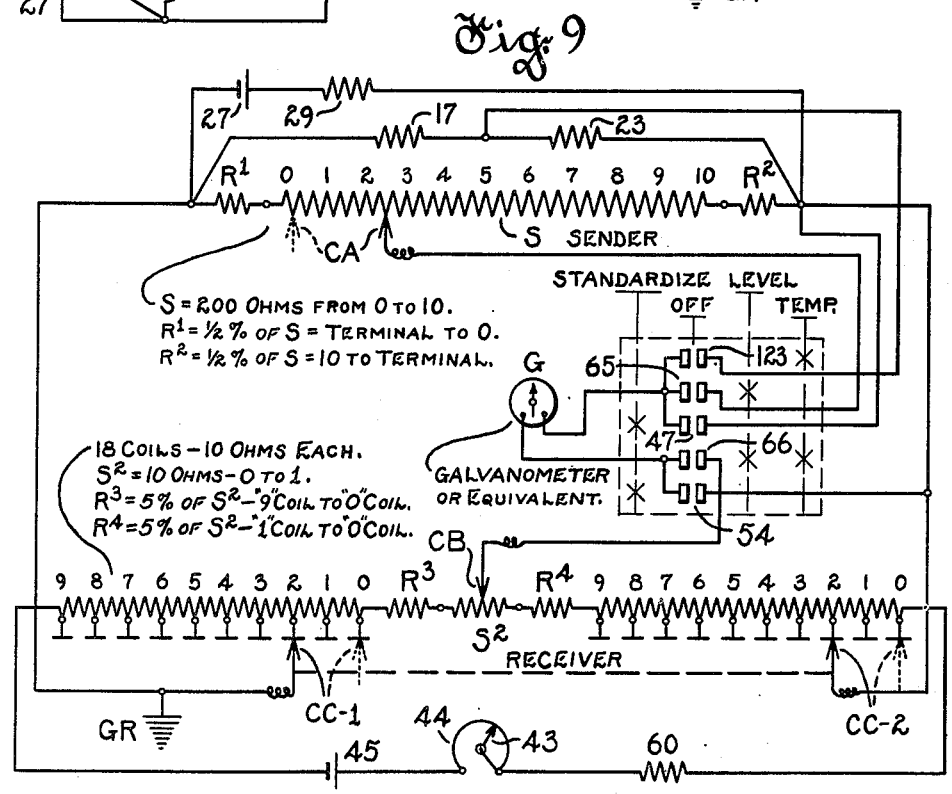
Inventor
Edwin X. Schmidt
By
Attorney Patented May 4, 1954

2,677,276

UNITED STATES PATENT OFFICE 2,677,276

LIQUID LEVEL AND TEMPERATURE INDICATING APPARATUS

Edwin X. Schmidt, Chenequa, Wis., assignor to Cutler-Hammer, Inc., Milwaukee, Wis., a corporation of Delaware Application July 26, 1948, Serial No. 40,696

3 Claims. (Cl. 73—292)

This invention relates to an improved apparatus for distantly indicating the value of a condition; and more particularly to distant liquid level and temperature indication for tank farms and the like.

An object of the invention is to provide an indicating apparatus of the aforementioned character whereby an attendant at a distant (or common) point may readily and accurately ascertain in sequence the level and the average temperature of the liquid or liquids in each of a multiplicity of storage tanks.

Another object is to provide a liquid level indicating system comprising a sending potentiometer for each tank and a receiving potentiometer common thereto, with associated switching means for selection of the tank with respect to which the measurements are to be made at any instant, and automatically operable self-standardizing means responsive to the conditions at each particular sending station when active.

Another object is to provide such an indicating system wherein each sending station includes a resistance thermometer, a sending potentiometer positioned by a special float, and a single dry cell for supplying current to the sending potentiometer and its associated thermometer.

Another object is to provide such a system wherein each sending station is connected to the receiving station through four wires, and wherein a null method of measurement is employed, so that no current flows through the respective wires when readings are taken, wherefore the readings are unaffected by the resistance of the connecting wires.

Another object is to provide such a system wherein the respective sending potentiometer slide wires and the common receiving potentiometer slide wire may have a total length of twenty-five feet or more; the receiving potentiometer being provided with an indicator scale operable throughout the entire range of movement of the receiving potentiometer slide wire brush, the indication on which scale can easily be read within a sixteenth of an inch over a range of fifty feet.

Another object is to provide a system of the aforementioned character wherein variations in the total resistance of the measuring portion of the sending circuit does not adversely affect the accuracy of the distant indicator, thus minimizing the degree of restriction in respect of the selection of materials of which the respective slidewires are to be composed, and, further, permits use of the thermometer circuit in parallel with the slidewire.

Another object is to provide floats of novel form for positioning the respective sending potentiometers in such a manner as to properly indicate the actual level of the liquid in each tank regardless of differences or changes in density of the liquid or liquids within the respective tanks in which they float.

Another object is to provide a thermometer of novel form whereby the average temperature of the entire body of liquid in each tank may be accurately ascertained and indicated.

Another and more specific object is to provide such a thermometer comprising a fine nickel wire, which is enclosed with a reinforcing spring wire within a flexible protective tubing formed of a suitable synthetic plastic, one end of which tubing is attached to the tank bottom, and the other end of which is attached to a float of suitable size; whereby the reinforcing spring acts to substantially equalize the disposition of the thermometer between the bottom of the tank and the upper surface of the liquid.

Another object is to provide a system whereby from liquid level indication, strapping tables, and temperature correction tables for the particular liquids in the respective tanks, the actual liquid content of each tank may readily be calculated.

Other objects and advantages of the invention will hereinafter appear.

The accompanying drawings illustrate an embodiment of my invention which will now be described; it being understood that the embodiment illustrated is susceptible of modification, in respect of certain structural details thereof, without departing from the scope of the appended claims.

In the drawings, Figure 1 is a schematic and diagrammatic illustration of a liquid level and temperature measuring and indicating system as applied to a multiplicity of tanks for liquids, forming a so-called "tank farm."

Fig. 2 is a view, partly in elevation and partly in vertical section, of one of the float units and the associated means for effecting operation of the sending potentiometer type rheostat associated therewith.

Fig. 3 is a top plan view of the float unit illustrated in Figs. 1 and 2.

Fig. 4 is a fragmentary view, partly in elevation and partly in vertical section, of the fixed elements of the sending slide wire potentiometer type rheostat and illustrating the manner in which the movable contactor is adapted to cooperate therewith.

Fig. 5 schematically illustrates my improved thermometer resistance, and the float means associated therewith, whereby the resistance wire is substantially evenly distributed throughout the entire depth of the liquid in the tank.

Fig. 6 is a greatly enlarged view, in transverse cross section, of the aforementioned flexible plastic tubing and the insulated resistance wire and reinforcing spring wire housed within said tubing.

Fig. 7 illustrates diagrammatically the float, the counterweight, and the cables connected between said parts and their respective drums; certain legends being added to said figure for use in mathematical formulae hereinafter set forth.

Fig. 8 is a diagrammatic illustration of certain elements of the present device as applied to a system involving manual setting of the common receiving potentiometer rheostat and manual setting of a rheostat to be connected in parallel with said receiving potentiometer rheostat, and Fig. 9 is a diagrammatic illustration, in greater detail, of one of the like sending potentiometer rheostats, and the receiving potentiometer rheostat common thereto.

Referring to Fig. 1, it is desired to indicate at a common point, or single receiving station, 14 the liquid temperature and the liquid level in each of a plurality of tanks; one of which is represented by the liquid level, shown in dotted lines at 15, having the float unit associated therewith, as indicated in general by the numeral 16. A resistance type thermometer is positioned within each tank, as diagrammatically illustrated at 17. Other elements of the sending stations respectively associated with each of the tanks are shown more or less diagrammatically within the dotted line rectangle 1; the corresponding sending stations of the other five tanks of the particular installation herein illustrated being diagrammatically illustrated by the full line rectangles designated by numerals 2, 3, 4, 5 and 6, respectively.

The float unit 16 in each tank is suspended from a cable 7; said float unit being adapted to rise or fall with each change in the liquid level in its respectively associated tank. Cable 7 is so arranged as to effect, or permit, turning of a drum 8 in accordance with the fall or rise in liquid level, through the medium of a counterweight 9 associated with float unit 16; the supporting cable 10 of counterweight 9 being unwound from or wound onto a drum 11, which is tapered as shown to compensate for the weight of the variable length of cable 7 between drum 8 and the float unit 16 and the variable length of cable 10 between drum 11 and weight 9.

Rotation of drums 8 and 11 effects corresponding rotation of a threaded shaft $8^a$, which in turn effects movement of a slide wire brush or bridging contactor $8^b$ for cooperation with the slide wire resistance, shown diagrammatically at S, forming part of a sending potentiometer.

The resistance type thermometer unit 17 in each tank is preferably shaped or wound to spiral form in such a manner that the coils thereof will nest within each other in a common plane upon the bottom wall of the tank, when the latter is empty. Resistance thermometer 17 is preferably rigidly attached at one end to the bottom wall of the tank 18 (Fig. 5), as indicated at 19; a float 20 of suitable size being attached to the other end of thermometer 17, so that the latter will be substantially evenly distributed, throughout its length, between the bottom wall of tank 18 and the liquid level 15, aforementioned.

Thermometer resistance 17 preferably comprises a suitable length of resistance material; such as a nickel wire $17^a$ of very small cross sectional area having a predetermined temperature-resistance coefficient. Resistance wire $17^a$ is preferably in the form of a loop extending from the point 19 at the bottom wall 18 of tank 17 to the point of support of the upper end portion of said loop by float 20. As shown in Fig. 6, wire $17^a$ is provided with a suitable insulating covering or coating $17^b$ throughout the active length thereof; whereby the arm portions of the loop are insulated from lateral contact with each other, and from contact with the reinforcing spring wire $17^c$. Wires $17^a$ and $17^c$ are enclosed within a suitable length of flexible plastic tubing $17^d$, as illustrated, thus insulating wire $17^c$ from contact with tank 18 and from the liquid within the latter. I have obtained excellent results by using tubing $17^d$ composed of the flexible plastic sold commercially under the trade name of "Saran"; although it is to be understood that tubing formed of any other flexible plastic of suitable composition might be employed.

In the potentiometer type sending unit indicated at 1 in Fig. 1, a battery 27 supplies current to the slidewire S and its paralleling circuit consisting of conductors 26 and 25, thermometer 17, conductors 21 and 22, resistance 23, and conductor 24. Included in the battery circuit are conductor 26, battery 27, conductor 28 and fixed resistor 29. Conductors $G^1$, $S^1$ and $T^1$ respectively connect to the low (left-hand) end of slidewire S, to the high end of slidewire S, and to the junction of conductor 21 with conductor 22 (at the left-hand end of resistance 23). Conductor B' connects with slidewire S through the medium of brush $8^b$.

Conductors $G^1$, $T^1$, $S^1$ and $B^1$ extend from sending station 1 to a suitable selector switch, which is shown at 32 as being of the drum type, as follows: Conductor $T^1$ extends from the point of juncture of conductors 21 and 22 to a stationary contact 34 on drum 32; conductor $S^1$ extends from the aforementioned common point 30 to a stationary contact 36 on drum 32; conductor $G^1$ extends from the common point between conductors 25 and 26 and the left-hand end of slidewire potentiometer S to conductor 33; and conductor $B^1$ extends from the point of engagement of slidewire contactor $8^b$ therewith to the stationary contact 35 on drum 32. Thus, if the member $32^a$ of drum 32 is manually moved from the "off" position thereof illustrated to position "1" the mutually insulated portions $32^b$, $32^c$ and $32^d$ will simultaneously act respectively to bridge the pairs of drum contacts 34, 37, 35, 38 and 36, 39, thereby effecting presetting of circuits respectively including one or more of the aforementioned conductors $T^1$, $S^1$, $G^1$ and $B^1$ for completion upon manual operation of an associated selector switch 40 (which may also be of the drum type) from its "off" position in one direction to a position designated "Standardize" or in the other direction from "off" in sequence to positions designated "Level" and "Temp."

For example, with drum 32 moved to its position "1," and with switch 40 in "Standardize" position, the conductors $G^1$ and $S^1$ are connected, in series with an amplifier system of known form, across the slidewire $S^2$ of the common receiving potentiometer; and at the same time a mechanical coupling 41 is completed between the motor 42, actuated from the amplifier system, and the contactor 43 associated with resistance 44 to effect adjustment or variation of the current supplied from a battery 45 to said receiving potentiometer $S^2$. In the standardizing operation the current supplied by battery 45 is adjusted so that the voltage drop across the receiving potentiometer slidewire $S^2$ will be exactly equal to the voltage drop across the sending slidewire potentiometer S.

More particularly, the circuit connections for said standardizing operation may be traced from the left-hand, or low end of slidewire S, by conductors $G^1$ and 33 to the left-hand, or low, end of slidewire $S^2$; and from the right-hand, or high, end of slidewire S, by conductor $S^1$ through contacts 36 and 39 (then bridged), by conductor 46 through contacts 47 of switch 40 (which contacts are then closed, as indicated at $47^a$), conductor 48, to the point 49 in the amplifier system aforementioned. Point 49 is the mid-point of the primary winding of transformer 76. Contacts 51 and 52 connected to the input side of transformer 76 periodically engage vibrator arm 50 to alternately close and open the circuit to lead 53, through contacts 54, then closed, and conductor 55 to the high end of slidewire $S^2$. Vibrator arm 50, moving in response to the variation and direction of current flow from lines $L^1$ and $L^2$ in coil $50^a$, causes any voltage difference between conductors 48 and 53 to alternately cause a flow of current in each part of the input side of transformer 76.

Conductors 48 and 53 enter the amplifier (designated in general by the dotted line rectangle 150 in Fig. 1) in which any impressed direct current voltage applied across conductors 48 and 53 is converted into an amplified alternating current in motor winding $42^c$, $42^d$, whose phase shift, in respect of current flow from lines $L^1$, $L^2$ to motor winding $42^a$, $42^b$, is related to the direction of the applied direct current voltage across conductors 48 and 53. See, for example, the disclosure in Patent No. 2,113,164, granted April 5, 1938, to Leeds & Northrup Co., as assignee of A. J. Williams, Jr. With zero direct current voltage applied to the amplifier 150, motor 42 is restrained against rotation in either direction. With a slight voltage difference motor 42 will run in one direction or the other, depending upon the direction of the applied voltage; said relationship being such that motor 42 operates to effect a change in the position of brush $43^a$ to thereby vary the value of the current flow in slidewire $S^2$, so that the voltage across $S^2$ is equalized with respect to the voltage across slidewire S.

As will be readily understood by those skilled in the art, any one of a number of well known alternative types of amplifier and servo mechanism might be employed to effect driving of shaft $56^a$, and shaft section $56^c$ upon engagement of clutch 41, in a manner to reduce the applied direct current voltage to zero.

Also, as aforementioned, during the standardizing operation, an abutment member 57 rigidly attached to a movable part of switch 40 acts through a rod 58 and a pivoted lever 59 to effect engagement of clutch members 41, whereby the shaft portion $56^c$ is driven simultaneously with, and in the same direction as, shaft $56^a$; a traveling nut $43^a$, carrying the contactor 43, having threaded engagement with shaft portion $56^c$ to effect shunting of more or less of the resistance 44 normally included in circuit with the right-hand end of slidewire $S^2$. A fixed resistance 60 of a suitable value is preferably included in circuit with the active portion of resistance 44.

Motor 42 is provided with a set of windings $42^a$ and $42^b$, which are connected in series with each other across a suitable source of electric current supply, represented by lines $L^1$ and $L^2$, in parallel relationship to the secondary winding $61^a$ of a transformer 61, the primary winding of which comprises two sections $61^b$ and $61^c$ arranged as shown with respect to each other and to a pair of electron tubes 62 and 63 in a well known manner to control the direction and degree of rotation of shaft $56^a$ and the associated shaft portion $56^c$ by motor 42.

With switch 32 in the aforementioned position "1," the level of liquid in the first tank of the group (associated with sending unit 1) may be measured and indicated by manually moving switch 40 to the "Level" position thereof, whereupon the motor 42 will be operated automatically (if necessary) to insure that the voltage drop in the left-hand end portion of sending slidewire potentiometer S between brush $8^b$ and ground 31 is equaled, or balanced, by effecting movement of the brush $56^b$ on the common receiving slidewire potentiometer $S^2$ to a position corresponding to the position of brush $8^b$ on the sending slidewire potentiometer S. The movement of brush $56^b$ is incident to rotation of shaft $56^a$ in one direction or the other by operation of motor 42.

The circuit connection for said liquid level indicating operation may be traced from the left-hand end of slidewire S, by conductors $G^1$ and 33 to the left-hand end of slidewire $S^2$; and from the lower end of brush $8^b$ by conductor $B^1$ through contacts 35 and 38 (which contacts are then bridged by portion $32^c$), by conductor 64 through contacts 65 of drum 40 (which contacts are then closed, as indicated at $65^a$), conductor 48, to the point 49 in the amplifier system, the relay contactor being engaged with one or the other of the contacts 51, 52, and from contactor 50 by conductor 53 through contacts 66 of drum 40 (which are then closed, as indicated at $66^a$), and by conductor 67 and slidewire extension $67^a$ thereof to the lower end of brush $56^b$, whose upper end engages the slidewire potentiometer $S^2$.

More particularly, the control of the direction of operation of motor 42 includes a second pair of windings $42^c$ and $42^d$ which are connected in series with each other; one terminal of winding $42^d$ being connected by conductor 68 to the common point $61^d$ between the aforementioned primary windings $61^b$ and $61^c$ of transformer 61, and one terminal of winding $42^c$ being connected to said common point $61^d$ by conductors 69 and 70, through condenser 71 and conductor 72. The other elements of the amplifier system may be of known form, as illustrated, and the same function in a well known manner. Thus, the anode $62^a$ of the tube 62 is connected to the outer end of winding $61^b$, and the anode $63^a$ of tube 63 is connected to the outer end of winding $61^c$.

Cathodes $62^b$ and $63^b$ of said tubes are jointly connected through resistance 73 to a conductor 74, which leads in one direction to conductor 69 and in the other direction, through a battery 75 to one terminal of the secondary winding $76^a$ of transformer 76. The other terminal of winding $76^a$ is electrically connected with the grid $77^c$ of an electron tube 77; the anode of said tube being shown at $77^a$ and the cathode thereof being shown at $77^b$. Anode $77^a$ is connected by conductor 78, through a condenser 79 and conductor 80, with the grids $62^c$ and $63^c$ of tubes 62 and 63, respectively. Cathode $77^b$ is connected to conductor 74.

Condenser 79 also has its right-hand terminal connected by conductor 80 and a resistor 81 with conductor 74; the left-hand terminal of said condenser being connected by conductor 78 through a resistor 82 and a battery 83 with conductor 74. A resistance 84 of suitable value is connected across the terminals of the aforementioned winding $76^a$ of transformer 76.

The float unit 16 is best illustrated in Figs. 2 and 3, and the same consists essentially of at least two floats pivotally connected to each other through the medium of one or more levers or sets of levers. In the preferred form of float unit 16, as illustrated, three floats are employed; the intermediate float being designated by the numeral 85, and the pair of like opposite end floats being designated by the reference numeral 86. Float 85 may be considered as the "master," and the floats 86 as the "compensators."

The intermediate float 85 has attached to its upper surface a pair of brackets $85^a$, the perforated upturned ends of which provide for pivotal connection thereto of the ends of sets of levers $85^b$, as indicated at points $k$ in Fig. 2; other ends of said sets of levers $85^b$ being pivotally attached to pairs of brackets $86^a$ at the points $m$ in Fig. 2; said brackets being attached to the upper surfaces of the respective compensator floats 86. The two inner levers $85^b$ of each set are of approximately V-shape or strut form; the adjacent portions thereof being flat, and spaced from each other sufficiently to accommodate therebetween the laminated, or double-thickness, arms designated by the numeral $85^c$. The pairs of inner levers $85^b$ of each set are rigidly attached to one end of the respective arms, as by means of pairs of rivets, as shown at $85^d$ in Fig. 3; and said arms $85^c$ are likewise pivoted at points $k$, Fig. 2, to rods or shafts $85^g$ which are connected to and alined with the pivot pins in the upturned ends of brackets $85^a$, as shown.

The adjacent ends of arms $85^c$ are provided with openings or eyes ($z$, $z$, Fig. 2) through which equal-length branch end portions $7^a$ and $7^b$ of cable 7 may be passed and tied or otherwise secured, as shown in Fig. 2.

The "master" float 85 also preferably has rigidly attached to its lower surface a pair of relatively long brackets $85^e$, the downturned end portions of which are perforated to accommodate pins for pivotal support of the adjacent perforated ends of sets of levers $85^f$, as indicated at points $k^1$ in Fig. 2; the other ends of said sets of levers $85^f$ being pivotally attached to diametrically opposite sides of the enlarged lower end portions of floats 86, as indicated at $86^b$ in Figs. 2 and 3 (points $m^1$, Fig. 2); the upper and lower sets of pivot $k$ and $k^1$ on float 85 and $m$ and $m^1$ on floats 86 being vertically alined under all normal operating conditions.

As best illustrated in Figs. 2 and 3 there is a predetermined fixed relationship between the pivot points $k$ and $m$, and the points $x$ and $z$; and under all normal operating conditions the pivot points $k^1$ will be vertically alined with points $x$, and pivot points $m^1$ will be vertically alined with points $m$. Likewise there is a predetermined fixed relationship between the weight and area of master float 85 with respect to the weight and area of each of the like compensating floats 86. The aforementioned relationship of such parts is adapted to provide a given relationship between the action of float unit 16 with respect to cable 7 and the counterbalancing action of weight 9 upon cable 10, whereby the float unit 16 will act to indicate the level 15 of the liquid in the particular tank, notwithstanding variations in the specific gravity of the liquid, as an incident to variations in temperature or composition of the liquid.

More particularly the relationship of the parts of float unit 16 is such that if the ratio of the length of each set of levers $85^b$ (including a portion of the respective arm $85^c$) between pivot points $z$ and $m$, in Fig. 2, to the length of the portion of each arm $85^c$ between pivot points $z$ and $m$ is expressed as equal to a constant L, then the depth of effective submergence of the respective floats 86 must be equal to L times the depth of effective submergence of the "master" float 85. The depth of effective submergence of each float 85 and 86 depends upon the downward force of the float (consisting of the weight of the float and any additional downward force exerted upon such float) divided by the product of the horizontal cross sectional area of the particular float at the liquid line and the density of the liquid.

By way of example, let it be assumed that the right-hand compensator float 86 and its associated set of levers $85^b$, $85^f$ and arm $85^c$ are removed from the assembly and that the lower end of cable 7 terminates at the point $z$ of the left-hand arm $85^c$ and exerts an upward force of two pounds as an incident to the action of counterweight 9, and drum 11 which is tapered in a manner to compensate for the weight of the cable 7 between drum 8 and said point $z$; the cable 7 will then exert an upward force of $$\frac{2L}{L-1}$$

upon pivot point $x$ and a downward force of $$\frac{2}{L-1}$$

upon pivot point $y$; which forces added to the weights of floats 85 and 86 must produce a depth of submergence of said left-hand compensator float 86 which is L times that of the master float 85. In other words, the weight of left-hand compensator float plus $$\frac{2}{L-1}$$

divided by the horizontal cross sectional area of said float must equal the weight of master float 85 minus $$\frac{2L}{L-1}$$

divided by the horizontal cross sectional area of float 85. Any change in density of the liquid will then affect the height of pivot point $y$, carried by float 86, by L times as much as it will the pivot point $x$, carried by float 85. Consequently the distance between the point of connection of cable 7 to arm $85^c$, at $z$ and the liquid level 15 will remain constant notwithstanding variations in specific gravity of the liquid.

The manner in which a substantially constant upward force upon the float unit 16 is insured may be described as follows: The counterweight 9 and the unwound portion of its associated cable 10 jointly exert a torque equal to the product of the radius of the variable radius drum 11 at the point where cable 10 leaves drum 11, multiplied by the combined weight of counterweight 9 and the unwound portion of cable 10. This torque must equal the torque exerted by a preselected constant upward pull of the cable 7 upon the float unit 16, plus the weight of the unwound portion of the float cable 7. The latter torque may be defined as: $R_F[W_F+(H_M-H_L)W_A]$, where:

$R_F$=constant radius of float drum 8;
$W_F$=desired upward force on float unit 16;
$H_M$=number of feet of unwound cable 7 with float unit 16 in its highest position; and
$H_L$=number of feet of unwound cable 7 with float unit 16 in its lowest position.
$W_A$=weight of cable 7 in lbs./ft.

The counterweight torque (weight of 9 plus weight of unwound portion of cable 10) should then be equal to the torque above-mentioned, and at any one point is equal to: $R_v(W_c+DC)$; where $R_v$ is the value of the variable pitch (radius); $W_c$ is the weight of counterweight 9 plus the weight of the unwound portion of cable 10, with the float unit 16 in its zero (or highest) position; and DC is the value of the increase in cable weight due to downward movement of float unit 16 from its highest position. As will be understood, if the cable 10 of counterweight 9 is relatively lighter, per unit length, than the cable 7 of float unit 16, and if the counterweight 9 is relatively heavy, with respect to the desired upward force upon the float unit 16, (which would require a relatively small, but variable, radius drum 11, as compared with the drum 8 for the float unit cable 7), and there would be a resultant relatively small change in unwound counterweight cable as compared with the change in wound up float cable 7, so that the value DC would become insignificant, wherefore a constant increase in the value $R_v$ would satisfy the requirement in respect of torque. This is desirable from the manufacturing viewpoint, and the error involved in respect of DC is slight. This latter error can be, and is, further reduced without changing the desirable manufacturing advantage of having a constant increase in pitch radius by increasing the pitch radius increase rate by the DC value at two points in the operating range; for example, at twenty-five per cent and at seventy-five per cent of full travel of cable 10; so that torque compensation will be perfect at these two points and will depart only slightly therefrom at intermediate points. The amount of departure from perfect torque compensation at intermediate points is thereby reduced to an insignificant value.

With reference to the diagrammatic showing of Fig. 7, the following mathematical formulae may be employed to provide for determination of the various dimensions, weight of counterweight 9, and weights per unit length of cables 7 and 10 which may be combined to provide for accomplishment of the results herein contemplated.

Thus, in Fig. 7 and/or in the following equations, the legends employed are as follows:

$W$=design lift for float operation (pounds)
$W_1=W+B(C_1)$, where $B$=feet of cable between float and design pull point, and $C_1$=weight of cable 7 per ft. (lbs./ft.)
$W_2$=weight of counterweight 9 in pounds
$C_2$=weight per ft. of counterweight cable 10 (lbs./ft.)
$x$=distance in ft. between datum line and design pull point
$x_0$=distance in ft. between axis of drum 8 and datum line
$y$=distance in ft. between axis of drum 11 and counterweight 9
$R$=radius of drum 8 in inches
$r$=radius of drum 11 in inches assuming a condition where $x=0$ and $y=0$, then for balancing of the float unit 16 and its associated cable 7, with respect to counterweight 9 and its associated cable 10, the values indicated by the following equation are employed:

(1) $R[W_1+C_1(x_0-x)]=r(W_2+C_2y)$ or (2) $\dfrac{r}{R}=\dfrac{W_1+C_1(x_0-x)}{W_2+C_2y}$ also (3) $\dfrac{dy}{dx}=\dfrac{r}{R}$, or $\dfrac{dy}{dx}=\dfrac{W_1+C_1(x_0-x)}{W_2+C_2y}$ or (4) $(W_2+C_2y)\,dy=[W_1+C_1(x_0-x)]\,dx$ Integrating:

(5) $W_2y+\dfrac{C_2y^2}{2}=W_1x+C_1\left(x_0x-\dfrac{x^2}{2}\right)$ or (6) $\dfrac{C_2y^2}{2}+W_2y-W_1x-C_1\left(x_0x-\dfrac{x^2}{2}\right)=0$ or (7) $y=\dfrac{-W_2\pm\left(W_2^2+2C_2\left[W_1x+C_1\left(x_0x-\dfrac{x^2}{2}\right)\right]\right)^{1/2}}{C_2}$ Substituting Equation 7 for $y$ in Equation 2:

(8) $\dfrac{r}{R}=\dfrac{W_1+C_1(x_0-x)}{W_2+C_2\left[\dfrac{-W_2\pm\left(W_2^2+2C_2\left[W_1x+C_1\left(x_0x-\dfrac{x^2}{2}\right)\right]\right)^{1/2}}{C_2}\right]}$ (9) $\dfrac{r}{R}=\dfrac{W_1+C_1(x_0-x)}{W_2-W_2\pm\left(W_2^2+2C_2\left[W_1x+C_1\left(x_0x-\dfrac{x^2}{2}\right)\right]\right)^{1/2}}$

(10) $\dfrac{r}{R}=\dfrac{W_1+C_1(x_0-x)}{\pm\left(W_2^2+2C_2x\left[W_1+C_1\left(x_0-\dfrac{x}{2}\right)\right]\right)^{1/2}}$ In the following equations the value of $y$ given in Equation 7 and the value of $$\dfrac{r}{R}$$

given in Equation 10 are employed in solving for the radius of the variable radius drum 11, with the values of certain factors as below set forth. It is to be noted that the departure from a straight line in value of $r$ is extremely small, due to the light weight of the counterweight cable 10. With a heavier counterweight cable 10 the departure would be greater; and, accordingly, the aforedescribed procedure of using two intermediate points (at twenty-five per cent and seventy-five per cent of full travel of cable 10) at which the pitch radius increase rate afforded by drum 11 is increased would be desirable to insure substantially perfect operation of the compensating means throughout its total range of operation.

With actual values of certain factors as follows:

$W$=2 lbs.
$B$=3 ft.
$C_1=C_2$=.001477 lb./ft.
$W_1=2+3\times.001477=2.00443$ lbs.
$W_2$=5.555 lbs.
$x_0$=50 ft.
$R$=9.549276 inches then the foregoing Equations 1 to 10 provide the values indicated following when the distance $x$ is successively 0, 25 and 50 ft.

| | | | |
|---|---|---|---|
| $x$ | 0 ft. | 25 ft. | 50 ft. |
| $y$ | 0 ft. | 9.26 ft. | 18.32 ft. |
| $\frac{r}{R}$ | .37412 | .36657 | .35908 |
| $r$ | 3.5725 in. | 3.5004 in. | 3.4290 in. |
| $(W_1+C_1y)r$ | 19.845241b.-in. | 19.492 lb.-in. | 19.141 lb.-in. |
| | Torque counterweight side | | |
| $[W_1+C_1(x_0-x)]R$ | 19.846 lb.-in. | 19.493 lb.-in. | 19.141 lb.-in. |
| | Torque float unit side | | |

As with a simple float, the pull of cable 7 will affect the degree of submergence of the compound float 16, an effect which can be reduced by making the floats of relatively large horizontal area, with a corresponding reduced degree of submergence under any given conditions. In a compound float of the character herein disclosed economic considerations make it desirable to have at least those portions of the compensator or secondary floats 86 which may move above or below the level 15 of the liquid of smaller horizontal cross sectional area than the master float 85. It is also desirable that the aforementioned value L should be equal to three or more. That is to say, that the distance between points $x$ and $y$ in Fig. 2 should be at least three times as great as the distance between points $x$ and $z$.

As will be understood by those skilled in the art, it is not necessary that the portions of the floats 85 and 86 which never rise above the liquid level or line shall be of any particular form or dimensions in horizontal cross section. Accordingly the bottom walls of floats 85 and 86 might be made of inverted cone-shape (not shown), so that vapors or gases would not be trapped or held below the respective floats (with a consequent effect upon the buoyancy thereof), and so that the strength of the floats would be increased. Also where the compound float unit is to be employed in conjunction with only very dense liquids, the compensator floats (corresponding to floats 86) might be made of such size and shape that the bottom walls thereof would not normally extend below the bottom of the master float 85.

As herein shown, I prefer to use one master float 85 and two like compensating floats 86. With the construction shown in Figs. 2 and 3 minor errors would theoretically be introduced, due to the variable angle formed by the branch ends $7^a$ and $7^b$ between the common point of connection $7^c$ thereof to cable 7 and the respective points of pivotal connection thereof, at $z$, $z$, Fig. 2, to the adjacent ends of arms $85^c$. However, with the length of levers $85^f$ relatively long with respect to the degree of submergence of floats 86 the aforementioned variable angle is sufficiently small so that no appreciable error results, even though the branch ends $7^a$ and $7^b$ of cable 7 are relatively short; provided that the levers $85^b$ are, in a body of liquid of average density, positioned approximately horizontally.

Referring again to Fig. 1, it will be apparent that upon operation of motor 42 in either direction the extension of shaft $56^a$ which is indicated diagrammatically by the dotted line $56^d$ will simultaneously effect rotation of an indicating disk of circular form, as indicated by the dotted line circle $14^a$; said disk preferably having an inner circle of numerals and calibrated marks, as indicated by the numeral "95" and the groups of short radial lines 120 on opposite sides of said numeral "95." In practice said inner circle is provided with twenty numerals (5, 10, 15, etc., up to 100), with twenty-five equal spaces 120 between each pair of indicating numerals. For example, it may be assumed that each complete rotation of disk $14^a$ represents one complete rotation of drum 8; so that if one complete turn of cable 7 is wound upon or unwound from drum 8 (with the latter having a periphery of, say, five feet) the corresponding complete rotation of disk $14^a$ will indicate at a given point $121^a$ adjacent window 121 that the liquid level 15 in the particular tank has risen or fallen a distance of five feet. In practice the group of tanks in any particular tank farm will usually be of substantially the same height and of the same transverse dimensions, but such an arrangement is not necessary. On the other hand, tanks with which my measuring apparatus may be employed are likely to provide for maximum liquid levels from as low as twenty feet to as high as forty feet, or higher; and accordingly I provide for accurate measurement of any maximum level to be encountered. More particularly, I provide on disk $14^a$ a projection (not shown) which is adapted upon each complete rotation of said disk from a given position to effect a step of movement of an associated disk (which may bear the numbers "1" through "10," or higher, as represented by the numeral "6" which is in register with the auxiliary window 122 in Fig. 1). Thus in the particular setting of the indicating disks shown in Fig. 1 the numeral "6" indicates that the level 15 of the first tank of the group is at six times five feet, or thirty feet, plus ninety-five one-hundredths of five feet, or four and three-fourths feet, so that the level is indicated as thirty-four and three-fourths feet. If the liquid level should fall exactly five feet the associated disks would be moved accordingly so that the numeral "5" would show in window 122 and the numeral "95" would again register with the point or line $121^a$ at the receiving station 14.

When it is desired to measure the average temperature of the liquid in the first tank of the group, the rotary switch or drum 32 is allowed to remain in its aforementioned position "1," and switch 40 is moved from the aforementioned "Level" position to the position marked "Temp." (indicating "temperature"). In this position of switch 40 the contacts 66 and 123 thereof will be closed, as indicated at $66^b$ and $123^b$ in Fig. 1. Under these conditions the voltage drop of thermometer 17 (which is equal to the value of the thermometer resistance divided by the sum of the thermometer resistance plus the value of the resistance 23 in series with the thermometer resistance, multiplied by the voltage of the entire slide-wire resistance S) is established between the low (or left-hand) end of the receiving slide-wire resistance $S^2$ and the contact $56^b$ associated with the latter, by automatically effecting movement of said brush $56^b$, through operation of motor 42 as previously described. The disk $14^a$ (Fig. 1) which is driven simultaneously with brush $56^b$ by motor 42 is calibrated (inner circle 120) to indicate in feet and decimal parts of a foot, and also (outer circle) in degrees of temperature. For such temperature measurement only a limited part of the outer circle of indicating numerals will ordinarily be utilized inasmuch as a major portion of the total drop in the sending slide-wire rheostat S under these conditions will be in the series resistor 23.

More particularly, during temperature measurement a circuit extends from the left-hand terminal of battery 27, by conductor 25 to the lower terminal $17^f$ of thermometer resistance 17, through the latter and upper terminal $17^e$ by conductor 21 through conductor $T^1$, contacts 34 and 37 (which are then bridged by contact block 32$^b$) by conductor 124 through contacts 123 (which are then closed, as indicated at 123$^b$), by conductor 48 to the point 49 between the primary windings of transformer 76, by one or the other of contacts 51 or 52 to contact 50 and conductor 53, to contacts 66 (which are then closed, as indicated at 66$^b$), by conductor 67 and extension 67$^a$ to contact 56$^b$ and the portion of potentiometer rheostat S$^2$ to the left of said contact, and by conductor 33 to conductor G$^1$ and ground at 31. A circuit likewise extends from the aforementioned conductor 21 by conductor 22 and resistor 23 to the common point 30, and thence through the total length of slide-wire resistance S to ground at 31. The parts of the receiver 14 will act in the manner aforedescribed to effect operation of motor 42 in a direction and to a degree to accurately indicate, by the position of the outer circle of disk 14$^a$, the temperature of the liquid in tank number 1.

In Fig. 2 I have shown at 87 a fragment of a cone-shaped roof of a tank adapted to contain a variable quantity of liquid as represented diagrammatically by the liquid level line 15. Roof 87 is provided with an opening of suitable size and shape to accommodate the lower end of a metal housing of suitable form, as shown more or less diagrammatically at 88. Although housing 88 is diagrammatically shown as rigidly and permanently attached to roof 87 as by means of a peripheral weld 89, it is to be understood that in practice such permanent connection will be made between a metal man-hole member, or a relatively large pipe flange, and roof 87; such man-hole member in turn affording means by which housing 88 may be removably attached to the tank, and affording access to the interior of the tank upon removal of housing 88. In any event, it is desired that housing 88 shall have a gas-tight connection with the tank, in order to save vapors from the liquid in the tank by conventional means, and to prevent such vapors from getting into the compartment in which the respective sending potentiometer rheostat is located.

Positioned within housing 88 is the aforementioned rotatable drum 8, which is non-rotatably attached, as by means of a set-screw 90, or the like, to the reduced end portion 91$^a$ of a metal shaft 91, preferably formed of stainless steel. Housing 88 is provided in the right-hand side wall thereof with an opening 88$^a$ to accommodate with a close fit the end portion 92$^a$ of a metal member 92 carrying a ball-race member 93, between which and a second ball-race member 95, attached to a portion 91$^b$ of shaft 91, a series of ball-bearings 94 are positioned. The portion 92$^b$ of member 92 is adapted to accommodate the portion 91$^a$ of the shaft with a sufficiently close fit to prevent capillary flow of a liquid, such as mercury, therebetween. The inner end of member 92 is provided with a cylindrical recess 92$^c$; the end thereof which opens into housing 88 being closed by a stainless steel plug 96 and by the shaft portion 91$^a$ which passes through an opening in said plug, with said parts so closely, but rotatably, fitted as to prevent capillary movement of mercury or a similar liquid therebetween. Plug 96 is provided with a flange which abuts the inner end of member 92; said flange being peripherally welded to member 92, as indicated at 96$^a$. Member 92 is provided with a flange 92$^d$ which is seated gas-tightly against the outer surface of housing 88; and said housing is rigidly secured by a multiplicity of screws 97, the shanks of which thread into tapped openings in said housing wall. Flange 92$^d$ is provided with a drilled passage 92$^e$ which extends vertically downward into communication with the recess 92$^c$; a suitable quantity of mercury being inserted to completely fill the remainder of recess 92$^c$ and a portion of the length of passage 92$^e$, thus providing a gas-tight seal between the interior and exterior of housing 88.

The other end of shaft 91 is provided with shouldered portions 91$^f$ and 91$^g$; the former having attached thereto a ball-race member 98, which cooperates with another ball-race member 99 to accommodate a group of ball-bearings 100. Member 99 is attached in any suitable manner to a metal member 101, which is provided with a flange 101$^a$; the latter being rigidly attached to a wall of another housing, a fragment of which is shown at 102 as by means of a multiplicity of screws 96 like those aforementioned.

Members 92 and 101 are provided with like tubular portions 92$^f$ and 101$^f$ extending toward each other; said portions being adapted to telescopically receive the reduced and shouldered opposite end portions of a tube 103, preferably of brass; and said parts are sealed to each other, as by means of the peripheral lines of welding shown at 92$^g$ and 101$^g$. Said wall of housing 102 is provided with an opening to accommodate with a close fit the portion 101$^h$ of member 101. A metal member is provided with a flange 104, which is secured, by screws 105, or the like, to portion 101$^h$; said member being also provided with a tubular portion 104$^a$ which affords only a slight amount of rotary clearance for the portion 91$^g$ of shaft 91.

A metal member having a flat, circular portion 106 of relatively large diameter, with a centrally located flanged opening 106$^a$ whereby the same is slidable onto the aforementioned tubular portion 104$^a$, for partial support by the latter; portion 106 having a plurality of openings formed therein to provide clearance for the shanks of screws 107 which are threaded into tapped openings in the housing wall 102 whereby said portion 106 is retained in a fixed position. Formed integrally with portion 106 is an outwardly projecting cylindrical flange 106$^b$; as shown in detail in Fig. 4. The cylindrical surface provided by portions 106 and 106$^b$ has applied thereto (and heat indurated thereon) a surface layer 108 of suitable thickness composed of a known type of synthetic resinous material. I prefer to employ a so-called polythene resin, which resin is sold commercially under the trade-name of "Rac-Lac-Dip." After hardening of the layer of resin 108, the same is ground or shaved off to provide a smooth cylindrical outer surface of preselected circumference (see Fig. 4); and said layer 108 then has formed therein, as by machining, a pair of parallel spiral grooves 108$^a$ and 108$^b$ of approximately semicircular form in transverse cross section, to accommodate about one-half the respective cross sectional areas of a coiled resistance wire 109$^a$ and a coiled conductor 109$^b$. In practice the parallel coiled wire 109$^a$ and conductor 109$^b$ are retained within their respective grooves by means of a suitable cement or adhesive (not shown). Wire 109$^a$ is provided with end terminals 130$^a$ and 130$^b$, while conductor 109$^b$ is provided with a single end terminal 131, to which both ends of the conductor may be assumed to connect. If the device of Fig. 4 were used in a circuit such as shown in Fig. 1 in lieu of S, $8^b$ and $B^1$, then terminal $130^a$ of wire $109^a$ would be connected to the junction of 26 and $G^1$ and the terminal $130^b$ to the junction point 30. Conductor $109^b$ would take the place of $B^1$ and its terminal 131 would be connected to contact 35.

As shown in Fig. 2, the aforementioned tapered drum 11 carries a hub portion $11^a$, which is adapted to fit onto the outer end of portion $91^g$ of shaft 91 and is non-rotatably secured to the latter in a suitable manner, as by means of a set screw 119. Cable 10 has one end thereof attached to the small end of drum 11, so that said cable will be wound onto or payed out from the spiral groove $11^b$ upon downward or upward movement, respectively, of the compound float 16, through the action of weight 9. Also, as aforestated, the gradually increasing diameter or peripheral length of each complete turn of the groove $11^b$ will serve to compensate for the increased weight of the length of cable 7 which is unwound from drum 3 as an incident to lowering of the liquid level 15 in the respective tank and for the decreased weight of the length of cable 10 between weight 9 and drum 11.

Drum 11 has rigidly attached to the inner or large end thereof an insulating plate 111, as by means of screws or bolts 112; and the outwardly projecting end of plate 111 has attached thereto a metal bracket 113, the two arms of which extend at substantially a right angle to each other. One arm of bracket 113 completely overlaps the coiled resistor wire 109 carried by the stationary member 106, and said bracket arm has riveted or otherwise attached thereto a resilient metal member 114, which is provided at its downwardly-biased forward end with a pair of downwardly bent perforated lugs $114^a$ and $114^b$. The perforations in lugs $114^a$ and $114^b$ are adapted to accommodate the shank of a pin 115, upon which is rotatably and slidably mounted, between said lugs, a contactor 116 which is in the form of a roller having tapered ends and a cylindrical intermediate portion $116^a$ which is sufficiently narrow to fit between each adjacent pair of turns of the resistor wire $109^a$, and conductor $109^b$ and thus permit and insure engagement of the tapered end surfaces of contactor 116 with such adjacent turns. As shown, pin 115 may be provided with a preformed head, $115^a$, for example, and an upset or riveted end $115^b$, whereby said parts are retained in assembled relation. It will be readily seen that contactor 116 is automatically guided, for movement thereof axially of pin 115, in accordance with the degree of rotation, or number of rotations, of drum 11; the degree and direction of rotary movement of the latter likewise corresponding to the degree of rise or fall of the liquid level 15.

The bottom wall 117 of the aforementioned housing (102, Fig. 2) is provided with an opening $117^a$ to accommodate, with a rather close fit, the open upper end of a cylindrical metal member or tube 118 of sufficient length and transverse dimensions to provide clearance for weight 9 in all positions of the latter. Member 118 is rigidly attached to wall 117, as by means of the peripheral line of welding $117^b$. The lower end of member 118 is preferably closed, as indicated in dotted lines at $118^a$.

As will be understood by those skilled in the art, after ascertainment and indication of the liquid level and the average temperature of the liquid in each tank individually, the operator at the central station, after making a note of such values, may refer to the usual strapping tables and temperature correction tables for the particular liquid in each tank, whereby the actual liquid content measurement of each tank may be readily and quickly calculated. In practice it is found that when the liquid level and average temperature of the liquid in each tank has been measured individually by use of the apparatus herein disclosed the operator at the central station will have ample time to calculate the actual liquid content of a particular tank while the apparatus is being operated (by manipulation of switches 32 and 40) to effect measurement of another value (liquid level, for instance) in respect of the body of liquid in the next succeeding tank. For this reason a single operator will be able to take frequent or repeated readings of the liquid levels and temperatures of a very large number of individual tanks during any given substantial period of time, without permitting or requiring the apparatus to remain idle during the aforementioned calculations by the operator.

As best illustrated in Figs. 2 and 3, the master float 85 and the compensator floats 86 are preferably formed of punched and stamped sheet metal parts. Thus, the top wall $85^g$ of float 85 may consist of a flat sheet metal punching of circular contour; wall $85^g$ having a centrally located clearance opening formed therein, and a nut $85^h$ (Fig. 2) being welded to the inner surface thereof in alinement with said opening. A bolt $85^i$ is threaded into and through nut $85^h$ to extend downwardly a predetermined distance; a second nut $85^j$ being initially located adjacent the head of bolt $85^i$, and the same being finally tightened against the outer surface of part $85^g$. The remainder of float 85 may consist of a punched metal member which is drawn or spun to substantially cup-shape, as shown at $85^k$ in Fig. 2; the parts $85^g$ and $85^k$ being brought together and welded leak-tight to each other around the respective peripheries thereof. With said parts so united, the shank end of bolt $85^i$ will normally just touch the inner surface of the bottom wall of the complete float 85; thus assisting in insuring against substantial bending or distortion of the bottom and top walls of the float as an incident to use thereof in a body of liquid.

The compensating floats 86, 86 will each preferably consist of an inverted cup-shaped upper portion $86^c$, an intermediate portion $86^d$, and a flat, punched sheet metal bottom wall portion $86^e$; all of said portions having peripheral edges which overlap, and said edges being peripherally welded to provide leaktight connection therebetween. The top wall of portion $86^c$ of each float 86 is provided with a clearance opening, and a suitable nut is welded to the inner surface of said top wall. Relatively longer bolts $86^f$ are threaded through the respective nuts (like nut $85^h$ in float 85) to insure the desired spacing of the top and bottom walls of floats 86 when completed. Each bolt $86^f$ also preferably has associated therewith a nut (not shown) which acts as a lock-nut against the outer surface of the top walls of floats 86, to prevent accidental loosening of said bolts.

In Fig. 8 I have illustrated diagrammatically a modification, wherein S indicates the sending potentiometer rheostat individual to one of the tanks aforedescribed; the bridging contactor $8^b$ thereof being automatically adjustable in accordance with the level of liquid in the tank selected by the switching means, in the manner heretofore set forth. Included in the circuit is an indicating galvanometer G, which serves to indicate the degree of unbalance resulting from the automatic movement of contactor 3b. However, instead of employing the servo mechanism hereinabove described for effecting the automatic follow-up adjustment of contactor CB of the receiving potentiometer S², said contactor CB is adapted to be manually adjusted to effect the desired balancing of the circuit, with resultant accomplishment of the desired effect. In a similar manner, I provide a manually adjustable rheostat 135, the purpose of which is to provide for standardization of the common receiving potentiometer rheostat with respect to each sending potentiometer rheostat (S) prior to ascertainment of the liquid levels in the respective tanks. The batteries 27 and 45 correspond with those bearing like numerals of reference in Fig. 1.

In Fig. 9 I have illustrated diagrammatically, in greater detail than in Fig. 1, the relationship and manner of operation of the common receiving potentiometer rheostat S² with respect to each sending potentiometer rheostat S. The legends applied to Fig. 9 show that, in the form of my invention herein illustrated, if the resistance value of sending potentiometer rheostat S is 200 ohms from one end thereof to the other, a resistance R¹ is preferably employed at the left-hand end thereof; said resistance R¹ having a value equal to one-half of one per cent (1 ohm) of the value of resistance S, from the left-hand terminal to "0"; and a resistance R² between the point "10" and the right-hand terminal also equal in value to one-half of one per cent (1 ohm) of the value of resistance S. The common receiving potentiometer rheostat S² is shown as comprising eighteen coils, each having a resistance value of ten ohms; said rheostat S² having a resistance value of ten ohms from "0" to "1"; a resistance R³ having a value of five per cent of the resistance of S² from #9 coil to "0" coil; and a resistance R⁴ having a value of five per cent of the resistance S² from #1 coil to "0" coil.

In operation, when contact CB goes below zero on S², or above 1 on S², limit switches (not shown) function to move the contactors CC-1 and CC-2 jointly toward the right or left in steps. For example, as shown in Fig. 9, sender contactor CA is at 2.45; that is to say, the voltage drop in sender rheostat S from GR ("ground") to contactor CA is one-half of one per cent plus 24.5 per cent of the voltage drop from zero to 10. On the receiving rheostat S² when balanced, the voltage drop from GR to contactor CC-1 is twenty per cent plus one-half of one per cent plus four and one-half per cent of the voltage drop across ten times the resistance value of S². If CA should move to 6.5, contactor CB would go to right-hand end of S², and CC-1 and CC-2 would then move step-by-step toward the left until they rest upon contacts 6, 6; whereupon CB would start moving toward the left away from the limit switch, stopping CC-1 and CC-2 from moving farther, and move until a reading of "6.50" is obtained. The operation of this mechanism under various other conditions will be apparent to those skilled in the art.

I claim:

1. In a distant liquid level indicating apparatus, in combination, a potentiometer type sending rheostat, a source of current supply for said rheostat, a slider contact forming part of said potentiometer rheostat whose position on said rheostat is indicative of the level of a body of liquid, a receiving potentiometer rheostat including a source of current supply therefor, a third rheostat in circuit with said receiving potentiometer rheostat for adjusting the current flow through the latter, a motor operated means for driving the slider of said last mentioned potentiometer rheostat either individually or jointly with said third rheostat in one direction or the other, an amplifier system responsive to minute differences in potential between preselected corresponding points on the sending and receiving potentiometer rheostats for effecting energization of said motor operated means to cause movement thereof in one direction or the other according to the sense or direction of the instantaneous potential difference, electric switching means selectively operable to one position for electrically connecting parts of said sending potentiometer with corresponding parts of the receiving potentiometer in series with said amplifier and effecting mechanical coupling of said third rheostat to said receiving potentiometer for joint operation by said motor operated means in a manner to establish the same potential across the receiving potentiometer rheostat as that existing on the sending potentiometer rheostat and operable to a second position to connect the sliders of said sending and receiving potentiometer rheostats in series with said amplifier.

2. In a system for indicating the level and temperature of a liquid in a tank, in combination, a sending potentiometer rheostat having a slider contact whose position is indicative of the level of a body of liquid, a source of current supply for said rheostat, a resistance type thermometer for sensing the temperature of the body of liquid connected in parallel circuit with the resistance element of said rheostat, a receiving potentiometer rheostat, a source of current supply for the last mentioned rheostat, a third rheostat for adjusting the current flow through the resistance element of the receiving rheostat, electric motor operated means for driving the slider of said receiving rheostat in one direction or the other, said motor operated means including connectable driving connections affording drive of the slider of said third rheostat concurrently with that of said receiving rheostat, and switch means selectively operable to one position to complete said driving connections and connect in circuit an end of the resistance element of said sending rheostat with a corresponding end of the resistance element of said receiving rheostat to afford balancing of the potential drops across the resistance elements of said sending and receiving rheostats, to a second position to connect together in circuit the sliders of said sending and receiving rheostats to afford indication of liquid level, and to a third position to connect said resistance type thermometer in circuit with the slider of said receiving rheostat, said motor operated means further including amplifying means having input terminals included in the aforementioned circuits established by said switch means and providing for operation of the motor in a direction and to a degree according to the direction and magnitude of the voltage across said input terminals.

3. In a system for indicating the level and temperature of a liquid in a tank, in combination, a battery, a sending potentiometer rheostat having a slider contact whose position is indicative of the level of a body of liquid and having a resistance element which is connected to ground at one end thereof with the low potential terminal of said battery and which is connected at its other end to the other terminal of said battery, a resistance type thermometer for sensing the temperature of the body of liquid connected in parallel with said battery and said resistance element of said sending rheostat, a receiving potentiometer rheostat, a third rheostat, a second battery connected in series with the resistance element of said third rheostat across the resistance element of said receiving rheostat, said resistance element of said receiving rheostat having the end thereof connected to the low potential terminal of said second battery connected to ground, electric motor operated means for driving the slider of said receiving rheostat in one direction or the other and including commutatable driving connections affording drive of the slider of said third rheostat concurrently with that of said receiving rheostat, and switch means selectively operable to one position to complete said driving connections and electrically connect in circuit said other end of the resistance element of said sending rheostat with the corresponding end of the resistance element of said receiving rheostat to afford balancing of the potential drops across the resistance elements of said sending and receiving rheostats, to a second position to connect together in circuit the sliders of said sending and receiving rheostats to afford indication of the level of the liquid at said receiving rheostat, and to a third position to connect said resistance type thermometer in circuit with the slider of said receiving rheostat to afford indication of the temperature of the liquid, said motor operated means further including amplifying means having input terminals included in the aforementioned circuit established by said switching means and providing for operation of the motor in a direction and to a degree depending upon the direction and magnitude of the voltage across said input terminals.

References Cited in the file of this patent

UNITED STATES PATENTS

| Number | Name | Date |
|---|---|---|
| 1,432,346 | Lorenz | Oct. 17, 1922 |
| 1,471,708 | Routin | Oct. 23, 1923 |
| 2,073,948 | Schofield, Jr. | Mar. 16, 1937 |
| 2,110,490 | Renner | Mar. 8, 1938 |
| 2,113,164 | Williams | Aug. 5, 1938 |
| 2,148,075 | Kiner | Feb. 21, 1939 |
| 2,154,066 | De Giers | Apr. 11, 1939 |
| 2,216,035 | Lang | Sept. 24, 1940 |
| 2,216,036 | Lang | Sept. 24, 1940 |